United States Patent
Inoue et al.

(10) Patent No.: US 9,828,686 B2
(45) Date of Patent: Nov. 28, 2017

(54) COPPER-NICKEL ALLOY ELECTROPLATING BATH AND PLATING METHOD

(71) Applicant: DIPSOL CHEMICALS CO., LTD., Tokyo (JP)

(72) Inventors: Manabu Inoue, Tokyo (JP); Satoshi Yuasa, Chiba (JP); Hitoshi Sakurai, Chiba (JP)

(73) Assignee: DIPSOL CHEMICALS CO., LTD., Tokyo (JP)

( * ) Notice: Subject to any disclaimer, the term of this patent is extended or adjusted under 35 U.S.C. 154(b) by 51 days.

(21) Appl. No.: 14/395,776

(22) PCT Filed: Apr. 19, 2013

(86) PCT No.: PCT/JP2013/061667
§ 371 (c)(1),
(2) Date: Oct. 20, 2014

(87) PCT Pub. No.: WO2013/157639
PCT Pub. Date: Oct. 24, 2013

(65) Prior Publication Data
US 2015/0090600 A1   Apr. 2, 2015

(30) Foreign Application Priority Data
Apr. 19, 2012   (JP) ................. 2012-095956

(51) Int. Cl.
C25D 3/56      (2006.01)
C25D 3/58      (2006.01)
C22C 9/06      (2006.01)
C22C 19/03     (2006.01)
C22C 19/05     (2006.01)

(52) U.S. Cl.
CPC ............... C25D 3/56 (2013.01); C22C 9/06 (2013.01); C22C 19/03 (2013.01); C22C 19/058 (2013.01); C25D 3/562 (2013.01); C25D 3/58 (2013.01)

(58) Field of Classification Search
CPC ... C25D 5/00; C25D 3/56; C25D 3/58; C25D 3/562
USPC ........................................ 205/162, 239, 255
See application file for complete search history.

(56) References Cited

U.S. PATENT DOCUMENTS

| | | | | |
|---|---|---|---|---|
| 1,750,092 A | * | 3/1930 | Crawford et al. | 205/256 |
| 2,728,744 A | * | 12/1955 | May et al. | 528/110 |
| 3,338,804 A | * | 8/1967 | Fischer | 205/269 |
| 3,833,481 A | | 9/1974 | Mentone | |
| 3,833,486 A | * | 9/1974 | Nobel et al. | 205/291 |
| 4,036,709 A | * | 7/1977 | Harbulak | 205/259 |
| 4,134,802 A | | 1/1979 | Herr | |
| 4,167,459 A | * | 9/1979 | Lee et al. | 205/239 |
| 5,800,930 A | * | 9/1998 | Chen et al. | 428/607 |
| 6,183,619 B1 | * | 2/2001 | Gillman et al. | 205/238 |
| 6,562,220 B2 | * | 5/2003 | Gillman et al. | 205/239 |
| 7,150,781 B2 | * | 12/2006 | Urata et al. | 106/1.18 |

FOREIGN PATENT DOCUMENTS

| | | |
|---|---|---|
| JP | 49-90234 | 8/1974 |
| JP | S5224133 | 2/1977 |
| JP | 58-133391 | 8/1983 |
| JP | 02-285091 | 11/1990 |
| JP | 05-098488 | 4/1993 |
| JP | 06-173075 | 6/1994 |

OTHER PUBLICATIONS

International Search Report for PCT Application No. PCT/JP2013/061667, dated Jul. 23, 2013, 1 page.
Bradley P et al: Journal of the Chemical Society. Faraday Transactions, Royal Society of Chemistry, Cambridge, GB, vol. 92, No. 20, Oct. 21, 1996, pp. 4015-4019.
Extended European Search Report (EESR) for EP 13779037.4 dated Nov. 27, 2015.

* cited by examiner

*Primary Examiner* — Zulmariam Mendez
(74) *Attorney, Agent, or Firm* — James F. Ewing; Foley & Lardner LLP

(57) ABSTRACT

The present invention provides a copper-nickel alloy electroplating bath which is characterized by containing (a) a copper salt and a nickel salt, (b) a metal complexing agent, (c) a plurality of conductivity-imparting salts that are different from each other, (d) a compound that is selected from the group consisting of disulfide compounds, sulfur-containing amino acids and salts of these compounds, (e) a compound that is selected from the group consisting of sulfonic acid compounds, sulfimide compounds, sulfamic acid compounds, sulfone amides and salts of these compounds, and (f) a reaction product of a glycidyl ether and a polyhydric alcohol. This copper-nickel alloy electroplating bath is also characterized by having a pH of 3-8.

4 Claims, No Drawings

COPPER-NICKEL ALLOY ELECTROPLATING BATH AND PLATING METHOD

CROSS-REFERENCE TO RELATED APPLICATIONS

This application is a national stage application under 35 U.S.C. §371 of International Application No. PCT/JP2013/061667, filed on Apr. 19, 2013, which claims the benefit to Japanese Application 2012-095956, filed on Apr. 19, 2012, each of which is incorporated herein by reference in its entirety.

TECHNICAL FIELD

The present invention relates to a copper-nickel alloy electroplating bath and a plating method. More specifically, the present invention relates to a plating bath having excellent bath stability and a plating method which are capable of obtaining a plated coating having a uniform composition of copper and nickel at any alloy ratio on a workpiece.

BACKGROUND ART

Generally, copper-nickel alloys exhibit excellent natures of corrosion resistance, ductility, processability, and high temperature properties by changing the ratio of copper and nickel, and also have characteristic natures such as electrical resistivity, heat resistivity coefficient, thermal electromotive force, and thermal expansion coefficient. Thus, studies have been conducted from the past to obtain such properties of copper-nickel alloys by electroplating. Numerous baths have been studied such as a cyan bath, a citric acid bath, an acetic acid bath, a tartaric acid bath, a thiosulfuric acid bath, an ammonia bath, and a pyrophosphoric acid bath, as the copper-nickel alloy plating bath that has been conventionally attempted; however, none has been put into practical use. The reasons that no copper-nickel alloy plating has been practically used include: (i) copper and nickel differ from each other in deposition potential by approximately 0.6 V, so that copper preferentially deposits; (ii) such a plating bath is unstable, so that an insoluble compound such as metal hydroxide is formed; and so forth. Examples of copper-nickel alloy plating baths reported so far include the followings.
(1) JP-A Sho 49-90234:
An electroplating bath containing copper, nickel, and boric acid at a pH of approximately 1, with which a plating having a copper content of 25% is obtained.
(2) JP-A Sho 52-24133
A bath containing a mixture of copper, nickel, citric acid, and ammonia water, with which a plating having any alloy composition is obtained.
(3) JP-A Sho 58-133391:
A pyrophosphoric acid-based bath containing pyrophosphate whose concentration is defined, to which primary and secondary additives are added to thereby obtain a bright plating.
(4) JP-A Hei 2-285091:
A bath containing nickel sulfate, nickel chloride, copper sulfate, sodium citrate, boric acid, and further sodium borate added thereto, and having a pH of 4 to 7.
(5) JP-A Hei 5-98488:
A weak acid bath containing copper, nickel, sodium tetraborate, saccharin, and a carboxylic acid such as malic acid, gluconic acid, and salicylic acid, with which a plating having a copper content of 20 to 60% and a cupronickel color is obtained.
(6) JP-A Hei 6-173075:
A weak acid bath containing copper, nickel, an aminocarboxylic acid, and sodium heptonate, with which a plating having a copper content of 18 to 64% and a cupronickel color is obtained.

SUMMARY OF INVENTION

The target alloy coatings are obtained using the above-described copper-nickel alloy plating baths. Nevertheless, there are some problems to be solved in order to stably obtain coatings having a uniform composition at an industrial level.
(1) JP-A Sho 49-90234:
The bath is a low pH bath (pH: approximately 1) containing no complexing agent, and the composition is obtained by adding a small amount of copper to a large amount of nickel. The preferential deposition of copper cannot be suppressed. Accordingly, there is a problem that the composition of a coating is strongly influenced by current density.
(2) JP-A Sho 52-24133:
Since the bath contains ammonia, the pH greatly varies. The bath is such that if the pH is low (in an acidic range), copper is likely to deposit, and if the pH is high (in an alkaline range), nickel is likely to deposit. The bath has a problem that as the bath pH varies, the composition of a plated coating varies. Moreover, there is another problem that since the effect of suppressing preferential copper deposition is weak, the composition of a plated coating is poor in uniformity due to the influence of cathode current density.
(3) JP-A Sho 58-133391:
The pyrophosphoric acid bath requires pyrophosphate in a molar amount twice or more than the metal concentration in the bath. The metal nickel concentration in the bath is restricted to 30 g/L or less. Accordingly, there are problems that the deposition efficiency is low and that the range where the brightness is obtained is narrow.
(4) JP-A Hei 2-285091:
Since the nickel concentration and the copper concentration in the bath are high, the action of suppressing preferential copper deposition is weak. There is a problem that if the cathode current density is in a low range, copper preferentially deposits. In addition, since the nickel concentration and the sodium citrate concentration in the bath are high, this brings about a problem that insoluble nickel citrate precipitates over time.
(5) JP-A Hei 5-98488:
The stability over time of the bath is improved by incorporating a carboxylic acid such as malic acid, gluconic acid, and salicylic acid, and the appearance of the plating is improved by adding saccharin. Nevertheless, the bath has problems that the effect of suppressing preferential copper deposition is insufficient and that stirring or the like causes preferential copper deposition.
(6) JP-A Hei 6-173075:
The weak acid bath contains copper, nickel, an aminocarboxylic acid, and sodium heptonate, with which a plating having a copper content of 18 to 64% and a cupronickel color is obtained. Nonetheless, there is a problem that as the copper and nickel concentrations in the bath vary, the composition of a plated coating also greatly varies. This makes it hard to obtain a coating having a stable composition. Further, there are problems that stirring lowers the action of suppressing preferential copper deposition and that the composition of the deposited coating is strongly influenced by cathode current density.

An object of the present invention is to provide a copper-nickel alloy plating bath and a plating method which solve the above-described problems of the conventional plating baths, and which are capable of stably obtaining a plating having any desired composition without precipitation and the like, the composition of the plated coating being less likely to be influenced by cathode current density.

The present invention provides a copper-nickel alloy electroplating bath comprising: (a) a copper salt and a nickel salt; (b) a metal complexing agent; (c) a plurality of conductivity-providing salts different from each other; (d) a compound selected from the group consisting of disulfide compounds, sulfur-containing amino acids, and salts thereof; (e) a compound selected from the group consisting of sulfonic acid compounds, sulfimide compounds, sulfamic acid compounds, sulfonamides, and salts thereof; and (f) a reaction product between a glycidyl ether and a polyvalent alcohol, wherein the bath has a pH of 3 to 8.

Moreover, the present invention provides a method for electroplating a substrate with a copper-nickel alloy, the substrate being selected from the group consisting of metal substrates made of copper, iron, nickel, silver, gold, and alloys thereof, and glass, ceramic, and plastic substrates whose surfaces are modified with any of the metals and alloys, the method comprising electroplating by using the copper-nickel alloy electroplating bath according to claim 1.

The present invention makes it possible to provide a copper-nickel alloy plating bath and a plating method which are capable of stably obtaining a plating having any composition without precipitation and the like, the composition of the plated coating being less likely to be influenced by cathode current density.

DESCRIPTION OF EMBODIMENTS

A copper-nickel alloy electroplating bath of the present invention contains (a) a copper salt and a nickel salt, (b) a metal complexing agent, (c) multiple conductivity-providing salts different from each other, (d) a compound selected from the group consisting of disulfide compounds, sulfur-containing amino acids, and salts thereof, (e) a compound selected from the group consisting of sulfonic acid compounds, sulfimide compounds, sulfamic acid compounds, sulfonamides, and salts thereof, and (f) a reaction product between a glycidyl ether and a polyvalent alcohol.
(a) Copper Salt and Nickel Salt The copper salt includes copper sulfate, copper(II) halides, copper sulfamate, copper methanesulfonate, copper (II) acetate, basic copper carbonate, and the like, but is not limited thereto. These copper salts may be used alone, or may be used as a mixture of two or more thereof. The nickel salt includes nickel sulfate, nickel halides, basic nickel carbonate, nickel sulfamate, nickel acetate, nickel methanesulfonate, and the like, but is not limited thereto. These nickel salts may be used alone, or may be used as a mixture of two or more thereof. The concentration of the copper salt and the nickel salt in the plating bath has to be selected in various manners in accordance with the composition of a plated coating to be obtained, but is 0.5 to 40 g/L, preferably 2 to 30 g/L for copper ion, and 0.25 to 80 g/L, preferably 0.5 to 50 g/L for nickel ion.

(b) Metal Complexing Agent

The metal complexing agent stabilizes the metals copper and nickel. The metal complexing agent includes monocarboxylic acids, dicarboxylic acids, polycarboxylic acids, oxycarboxylic acids, keto-carboxylic acids, amino acids, aminocarboxylic acids, salts thereof, and the like, but is not limited thereto. Specifically, the metal complexing agent includes malonic acid, maleic acid, succinic acid, tricarballylic acid, citric acid, tartaric acid, malic acid, gluconic acid, 2-sulfoethylimino-N,N-diacetic acid, iminodiacetic acid, nitrilotriacetic acid, EDTA, triethylenediaminetetraacetic acid, hydroxyethyliminodiacetic acid, glutamic acid, aspartic acid, β-alanine-N,N-diacetic acid, and the like. Among these, preferable are malonic acid, citric acid, malic acid, gluconic acid, EDTA, nitrilotriacetic acid, and glutamic acid. Moreover, salts of these carboxylic acids include magnesium salts, sodium salts, potassium salts, ammonium salts, and the like, but are not limited thereto. These metal complexing agents may be used alone, or may be used as a mixture of two or more thereof. The concentration of the metal complexing agent in the plating bath is preferably 0.6 to 2 times, more preferably 0.7 to 1.5 times, the metal ion concentration (molar concentration) in the bath.

(c) Conductivity-Providing Salts

The conductivity-providing salts provide the copper-nickel alloy electroplating bath with electrical conductivity. In the present invention, the conductivity-providing salts used have to be multiple conductivity-providing salts and different from each other. The conductivity-providing salts preferably include an inorganic halide salt and a salt selected from the group consisting of inorganic sulfates and lower alkanesulfonates.

The inorganic halide salt includes chloride salts, bromide salts, iodide salts of each of magnesium, sodium, potassium, and ammonium, and the like, but is not limited thereto. These inorganic halide salts may be used alone, or may be used as a mixture of two or more thereof. The concentration of the inorganic halide salt in the plating bath is preferably 0.1 to 2.0 mol/L, more preferably 0.2 to 1.0 mol/L.

The inorganic sulfates include magnesium sulfate, sodium sulfate, potassium sulfate, ammonium sulfate, and the like, but are not limited thereto. These inorganic sulfates may be used alone, or may be used as a mixture of two or more thereof.

The lower alkanesulfonates include magnesium salts, sodium salts, potassium salts, ammonium salts, and the like, and more specifically includes magnesium, sodium, potassium, and ammonium salts of methanesulfonic acid or 2-hydroxypropanesulfonic acid, and the like, but are not limited thereto. These sulfonates may be used alone, or may be used as a mixture of two or more thereof.

The concentration of the sulfate and/or the sulfonate in the plating bath is preferably 0.25 to 1.5 mol/L, more preferably 0.5 to 1.25 mol/L.

(d) Compound Selected from Group Consisting of Disulfide Compounds, Sulfur-Containing Amino Acids, and Salts Thereof The compound selected from the group consisting of disulfide compounds, sulfur-containing amino acids, and salts thereof includes, but is not limited to, disulfide compounds represented by a general formula (I), and the like:

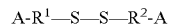

$$A-R^1-S-S-R^2-A \qquad (I)$$

where $R^1$ and $R^2$ each represent a hydrocarbon group, and A represents a $SO_3Na$ group, a $SO_3H$ group, an OH group, a $NH_2$ group, or a $NO_2$ group.

The hydrocarbon group is preferably an alkylene group, more preferably an alkylene group having 1 to 6 carbon atoms. Specific examples of the disulfide compounds include bis-sodium sulfoethyl disulfide, bis-sodium sulfopropyl disulfide, bis-sodium sulfopentyl disulfide, bis-sodium sulfohexyl disulfide, bis-sulfoethyl disulfide, bis-sulfopropyl disulfide, bis-sulfopentyl disulfide, bis-aminoethyl disulfide, bis-aminopropyl disulfide, bis-aminobutyl disulfide, bis-aminopentyl disulfide, bis-hydroxyethyl disulfide, bis-hydroxypropyl disulfide, bis-hydroxybutyl disulfide, bis-hydroxypentyl disulfide, bis-nitroethyl disulfide, bis-nitropropyl disulfide, bis-nitrobutyl disulfide, sodium sulfoethyl propyl disulfide, sulfobutyl propyl disulfide, and the like, but are not limited thereto. Among these disulfide compounds, bis-sodium sulfopropyl disulfide, bis-sodium sulfobutyl disulfide, bis-aminopropyl disulfide are preferable.

The sulfur-containing amino acids include, but are not limited to, sulfur-containing amino acids represented by a general formula (II), and the like:

$$R\text{—}S\text{—}(CH_2)_n CHNHCOOH \quad (II)$$

where R represents a hydrocarbon group, —H, or —$(CH_2)_n$CHNHCOOH, and each n is independently 1 to 50.

The hydrocarbon group is preferably an alkyl group, more preferably an alkyl group having 1 to 6 carbon atoms. Specific examples of the sulfur-containing amino acids include methionine, cystine, cysteine, ethionine, cystine disulfoxide, cystathionine, and the like, but are not limited thereto. In addition, the salts thereof include sulfates, halide salts, methanesulfonates, sulfamates, acetates, and the like, but are not limited thereto.

These disulfide compounds, sulfur-containing amino acids, and salts thereof may be used alone, or may be used as a mixture of two or more thereof. The concentration of the compound selected from the group consisting of disulfide compounds, sulfur-containing amino acids, and salts thereof in the plating bath is preferably 0.02 to 10 g/L, more preferably 0.1 to 5 g/L.

(e) Compound Selected from Group Consisting of Sulfonic Acid Compounds, Sulfimide Compounds, Sulfamic Acid Compounds, Sulfonamides, and Salts Thereof The compound selected from the group consisting of sulfonic acid compounds, sulfimide compounds, sulfamic acid compounds, sulfonamides, and salts thereof makes the copper-nickel alloy-electroplated coating dense.

The sulfonic acid compounds and salts thereof include aromatic sulfonic acids, alkene sulfonic acids, alkyne sulfonic acids, salts thereof, and the like, but are not limited thereto. Specifically, the sulfonic acid compounds and salts thereof include sodium 1,5-naphthalenedisulfonate, sodium 1,3,6-naphthalenetrisulfonate, sodium 2-propene-1-sulfonate, and the like, but are not limited thereto.

The sulfimide compounds and salts thereof include benzoic sulfimide (saccharin), salts thereof, and the like, but are not limited thereto. Specifically, the sulfimide compounds and salts thereof include sodium saccharin, and the like, but are not limited thereto.

The sulfamic acid compounds and salts thereof include acesulfame potassium, sodium N-cyclohexylsulfamate, and the like, but are not limited thereto.

The sulfonamides and salts thereof include para-toluenesulfonamides, and the like, but are not limited thereto.

These sulfonic acid compounds, sulfimide compounds, sulfamic acid compounds, sulfonamides, and salts thereof may be used alone, or may be used as a mixture of two or more thereof. The concentration of the compound selected from the group consisting of sulfonic acid compounds, sulfimide compounds, sulfamic acid compounds, sulfonamides, and salts thereof in the plating bath is preferably 0.2 to 5 g/L, more preferably 0.4 to 4 g/L.

(f) Reaction Product Between Glycidyl Ether and Polyvalent Alcohol

The reaction product between a glycidyl ether and a polyvalent alcohol makes the copper-nickel alloy-electroplated coating dense.

In the reaction product between a glycidyl ether and a polyvalent alcohol, the glycidyl ether serving as the reaction raw material includes glycidyl ethers containing two or more epoxy groups in the molecules, glycidyl ethers containing one or more hydroxyl groups and one or more epoxy groups in the molecules, and the like, but is not limited thereto. Specifically, the glycidyl ether includes glycidol, glycerol polyglycidyl ether, ethylene glycol diglycidyl ether, polyethylene glycol diglycidyl ether, polypropylene glycol diglycidyl ether, sorbitol polyglycidyl ether, and the like.

The polyvalent alcohol includes ethylene glycol, propylene glycol, glycerin, polyglycerin, and the like, but is not limited thereto.

The reaction product between the glycidyl ether and the polyvalent alcohol is preferably a water soluble polymer obtained by a condensation reaction between an epoxy group of the glycidyl ether and a hydroxyl group of the polyvalent alcohol.

The reaction products between these glycidyl ethers and the polyvalent alcohol may be used alone, or may be used as a mixture of two or more thereof. The concentration of the reaction product between the glycidyl ether and the polyvalent alcohol in the plating bath is preferably 0.05 to 5 g/L, more preferably 0.1 to 2 g/L.

The copper-nickel alloy electroplating bath of the present invention has to be adjusted to have a pH of 3 to 8, preferably pH of 4 to 7. The pH of the plating bath can be adjusted with sulfuric acid, hydrochloric acid, hydrobromic acid, methanesulfonic acid, sodium hydroxide, potassium hydroxide, ammonia water, ethylenediamine, diethylenetriamine, triethylenetetramine, or the like.

Next, a plating method using the plating bath of the present invention will be described. A workpiece which can be electroplated by using the plating bath of the present invention, includes copper, iron, nickel, silver, alloys thereof, and the like. In addition, a glass substrate, a ceramic substrate, and a plastic substrate whose surfaces are modified with any of the metals and alloys, and the like are also effective.

When electroplating is conducted, it is possible to use, as an anode, an insoluble anode such as carbon, platinum, or platinum-plated titanium can be used. Alternatively, a copper-nickel alloy anode, an anode using copper and nickel in combination, and the like can also be used. Nevertheless, in this case, it is necessary to carefully control the metal concentration in the bath by examining the cathode deposition efficiency and the anode dissolution efficiency.

The bath temperature is generally 15 to 60° C., preferably 20 to 50° C. The cathode current density is generally 0.01 to 5 A/dm$^2$, preferably 0.05 to 4.0 A/dm$^2$. The plating time depends on a demanded thickness of a plating, but is generally 1 to 180 minutes, preferably 15 to 120 minutes.

The liquid in the bath may be stirred by air, liquid flow, or mechanically with a cathode rocker or the like. The thickness can be set in a wide range, but is generally 0.5 to 50 µm, preferably 3 to 20 µm. While plating is being conducted, the pH of the plating bath has to be maintained at 3 to 8 using the aforementioned pH adjuster.

The use of the plating bath of the present invention enables the metal coating to be deposited to have a copper/nickel composition ratio of 5/95 to 95/5.

When plating is conducted, the workpiece is subjected to a pre-treatment according to a conventional method and then the plating step.

In the pre-treatment step, at least one operation is performed: soak cleaning, electrolytic washing of a cathode or an anode, washing with an acid, and activation. Water washing is performed between every successive two operations. After the plating, it is only necessary that the resulting coating should be washed with water or hot water, followed by drying. Moreover, after the copper-nickel alloy plating is conducted, an anti-oxidation treatment, tin plating, tin alloy plating, or the like may also be carried out. The plating bath of the present invention can be used over a long time period without replacing the liquid, by maintaining each bath component at a constant level by using an appropriate replenishing agent.

Next, the present invention will be described based on Examples. However, the present invention is not limited to these. The composition of the plating bath and the plating conditions may be arbitrarily altered according to such gists that it is possible to obtain a plated coating having a uniform composition of copper and nickel at any alloy ratio on the above-described target workpiece, and that a copper-nickel alloy plating having excellent bath stability is obtained.

EXAMPLES

Examples 1 to 7 and Comparative Examples 1 to 7

For the evaluation of plating in Examples, the test piece used was an iron plate (SPCC) of 0.5×65×100 mm whose one surface was sealed with a Teflon (registered trademark) tape. The iron plate as the test piece was degreased with 5 w/v % Dasshi-39 [manufactured by DIPSOL CHEMICALS Co., Ltd.] and then washed with an acid of 10.5 w/w % hydrochloric acid, followed by electrolytic washing with 5 w/w % NC-20 [manufactured by DIPSOL CHEMICALS Co., Ltd.] and 7 w/v % sodium hydroxide solution. After the electrolytic washing, the iron plate was activated with 3.5% hydrochloric acid. Water washing was sufficiently performed between every successive two operations.

Next, each plating liquid shown in Table-1 was introduced into a plating tank made of an acrylic resin. A platinum plate was used as an anode, and the iron plate activated above as the test piece was connected to a cathode. The plating was conducted under conditions in Table-2. The thickness and the alloy composition of the obtained plating were determined with an X-ray fluorescence spectrometer. Table-3 shows the result.

In Comparative Examples also, plating was conducted in the same manner as in Examples under conditions shown in Table-5 using plating liquids having compositions shown in Table-4. The thickness and the alloy composition of the obtained plating were determined with an X-ray fluorescence spectrometer. Table-6 shows the result.

TABLE 1

Compositions of plating baths of Examples

| concentrations of components | Example 1 | 2 | 3 | 4 | 5 | 6 | 7 |
|---|---|---|---|---|---|---|---|
| (a) $Cu^{2+}$ (g/L) | 3 | 25 | 9 | 7.5 | 7.5 | 7.5 | 5 |
| (a) $Ni^{2+}$ (g/L) | 50 | 40 | 20 | 15 | 7.5 | 7.5 | 1 |
| metal concentration (mol/L) ($Cu^{2+} + Ni^{2+}$) | 0.9 | 1.1 | 0.5 | 0.37 | 0.25 | 0.25 | 0.1 |
| (b) malonic acid (mol/L) | — | — | 0.6 | 0.55 | — | — | 0.07 |
| (b) diammonium citrate (mol/L) | 0.8 | — | — | — | 0.2 | — | — |
| (b) nitrilotriacetic acid (mol/L) | — | 1.1 | — | — | — | 0.2 | — |
| metal complexing agent/metal molar concentration ratio (fold) | 0.9 | 1.0 | 1.2 | 1.5 | 0.8 | 0.8 | 0.7 |
| (c) sodium chloride (mol/L) | — | 0.75 | — | 0.5 | — | 0.6 | 0.5 |
| (c) potassium bromide (mol/L) | 1 | — | 0.2 | — | 0.25 | — | — |
| (c) magnesium sulfate (mol/L) | — | 0.5 | — | 1 | — | 0.9 | 0.8 |
| (c) ammonium methanesulfonate (mol/L) | 1 | — | 1.25 | — | 0.75 | — | — |
| (d) bis-sodium sulfopropyl disulfide (g/L) | — | 2 | — | 1 | — | 2.5 | 0.1 |
| (d) cysteine methanesulfonate (g/L) | 5 | — | 0.5 | — | 0.2 | — | — |
| (e) sodium 1,5-naphthalenedisulfonate (g/L) | — | 0.5 | 4 | — | 0.4 | — | 0.6 |
| (e) sodium saccharin (g/L) | 2 | 0.5 | — | 1 | — | 1.5 | — |
| (f) reaction product of ethylene glycol diglycidyl ether with propylene glycol (g/L) | — | 1 | — | 0.25 | — | 1 | 0.25 |
| (f) reaction product of glycerol polyglycidyl ether with polyglycerin (g/L) | 2 | — | 1.5 | — | 0.1 | — | — |
| pH | 4 | 5 | 5 | 5 | 8 | 7 | 6 |

Copper salt species: copper(II) methanesulfonate (Examples 1 and 5), copper(II) sulfate (Examples 2 and 4), copper(II) sulfamate (Example 3), copper(II) acetate (Example 6), copper(II) chloride (Example 7)
Nickel salt species: nickel methanesulfonate (Examples 1 and 5), nickel sulfate (Examples 2 and 4), nickel sulfamate (Example 3), nickel acetate (Example 6), nickel chloride (Example 7)
pH adjuster: methanesulfonic acid (Example 1), sodium hydroxide (Examples 2, 4, 6, and 7), potassium hydroxide (Example 3), ammonia water (Example 5)

TABLE 2

Plating conditions of Examples

| Items | cathode current density (A/dm²) | Example 1 | 2 | 3 | 4 | 5 | 6 | 7 |
|---|---|---|---|---|---|---|---|---|
| plating time (min.) | 0.5 | | | | 120 | | | |
| | 2 | | | | 30 | | | |
| | 5 | | | | 10 | | | |
| bath temperature (° C.) | | 50 | 50 | 50 | 25 | 25 | 25 | 50 |
| stirring | | | | | with stirring & without stirring | | | |

TABLE 3

Results obtained in Examples

| Items | cathode current density (A/dm²) | Example 1 | 2 | 3 | 4 | 5 | 6 | 7 |
|---|---|---|---|---|---|---|---|---|
| thickness (μm) with stirring | 0.5 | 13 | 13 | 12 | 12 | 12 | 12 | 12 |
| | 2 | 12 | 12 | 11 | 11 | 11 | 11 | 10 |
| | 5 | 9 | 9 | 8.5 | 8.5 | 8.5 | 8.5 | 8 |
| coating composition (Cu %) without stirring | 0.5 | 9 | 25 | 44 | 62 | 79 | 79 | 88 |
| | 2 | 10 | 22 | 42 | 60 | 80 | 80 | 91 |
| | 5 | 11 | 20 | 40 | 60 | 81 | 81 | 92 |
| coating composition (Cu %) with stirring | 0.5 | 9 | 25 | 45 | 61 | 79 | 80 | 88 |
| | 2 | 10 | 22 | 42 | 61 | 80 | 80 | 91 |
| | 5 | 8 | 20 | 40 | 58 | 82 | 81 | 92 |
| appearance with stirring | 0.5 | silver white glossy | silver white glossy | silver white glossy | silver white glossy | cupronickel color semi-glossy | cupronickel color semi-glossy | pale cupronickel color semi-glossy |
| | 2 | silver white glossy | silver white glossy | silver white glossy | silver white glossy | cupronickel color semi-glossy | cupronickel color semi-glossy | pale cupronickel color semi-glossy |
| | 5 | silver white glossy | silver white glossy | silver white glossy | silver white glossy | cupronickel color semi-glossy | cupronickel color semi-glossy | pale cupronickel color semi-glossy |
| stability of plating bath · formation of turbidity · precipitates after allowed to stand for 7 days at room temperature | | none | none | none | none | none | none | none |

TABLE 4

Compositions of plating baths of Comparative Examples

| concentrations of components | Comparative Example 1 | 2 | 3 | 4 | 5 | 6 | 7 |
|---|---|---|---|---|---|---|---|
| (a) $Cu^{2+}$ (g/L) | 3 | 25 | 9 | 7.5 | 7.5 | 7.5 | 5 |
| (a) $Ni^{2+}$ (g/L) | 50 | 40 | 20 | 15 | 7.5 | 7.5 | 1 |
| metal concentration (mol/L) ($Cu^{2+} + Ni^{2+}$) | 0.9 | 1.1 | 0.5 | 0.37 | 0.25 | 0.25 | 0.1 |
| (b) malonic acid (mol/L) | — | — | 0.6 | 0.55 | — | — | 0.07 |
| (b) diammonium citrate (mol/L) | 0.8 | — | — | — | 0.2 | — | — |
| (b) nitrilotriacetic acid (mol/L) | — | 1.1 | — | — | — | 0.2 | — |
| metal complexing agent/metal molar concentration ratio (fold) | 0.9 | 1.0 | 1.2 | 1.5 | 0.8 | 0.8 | 0.7 |
| (c) sodium chloride (mol/L) | — | 0.75 | — | 0.5 | — | — | 0.5 |
| (c) potassium bromide (mol/L) | 1 | — | 0.2 | — | 0.25 | — | — |
| (c) magnesium sulfate (mol/L) | — | 0.5 | — | 1 | — | 0.9 | — |
| (c) ammonium methanesulfonate (mol/L) | 1 | — | 1.25 | — | 0.75 | — | — |
| (d) bis-sodium sulfopropyl disulfide (g/L) | — | 2 | — | 1 | — | 2.5 | 0.1 |
| (d) cysteine methanesulfonate (g/L) | — | — | — | — | — | — | — |
| (e) sodium 1,5-naphthalenedisulfonate (g/L) | — | 0.5 | 4 | — | 0.4 | — | 0.6 |
| (e) sodium saccharin (g/L) | — | 0.5 | — | — | — | 1.5 | — |
| (f) reaction product of ethylene glycol diglycidyl ether with propylene glycol (g/L) | — | — | — | 0.25 | — | 1 | 0.25 |
| (f) reaction product of glycerol polyglycidyl ether with polyglycerin (g/L) | — | — | 1.5 | — | — | — | — |
| pH | 4 | 5 | 5 | 5 | 8 | 7 | 6 |

Copper salt species: copper(II) methanesulfonate (Comparative Examples 1 and 5), copper(II) sulfate (Comparative Examples 2 and 4), copper(II) sulfamate (Comparative Example 3), copper(II) acetate (Comparative Example 6), copper(II) chloride (Comparative Example 7)
Nickel salt species: nickel methanesulfonate (Comparative Examples 1 and 5), nickel sulfate (Comparative Examples 2 and 4), nickel sulfamate (Comparative Example 3), nickel acetate (Comparative Example 6), nickel chloride (Comparative Example 7)
pH adjuster: methanesulfonic acid (Comparative Example 1), sodium hydroxide (Comparative Examples 2, 4, 6, and 7), potassium hydroxide (Comparative Example 3), ammonia water (Comparative Example 5)

TABLE 5

Plating conditions of Comparative Examples

| Items | cathode current density (A/dm²) | Comparative Example | | | | | | |
|---|---|---|---|---|---|---|---|---|
| | | 1 | 2 | 3 | 4 | 5 | 6 | 7 |
| plating time (min.) | 0.5 | | | | 120 | | | |
| | 2 | | | | 30 | | | |
| | 5 | | | | 10 | | | |
| bath temperature (° C.) | | 50 | 50 | 50 | 25 | 25 | 25 | 50 |
| stirring | | | | | with stirring & without stirring | | | |

TABLE 6

Results obtained in Comparative Examples

| Items | cathode current density (A/dm²) | Comparative Example | | | | | | |
|---|---|---|---|---|---|---|---|---|
| | | 1 | 2 | 3 | 4 | 5 | 6 | 7 |
| thickness | 0.5 | 13 | 13 | 12 | 12 | 12 | 12 | 12 |
| (µm) | 2 | 12 | 12 | 11 | 11 | 11 | 11 | 10 |
| with stirring | 5 | 9 | 9 | 8.5 | 8.5 | 8.5 | 8.5 | 8 |
| coating | 0.5 | 100 | 95 | 55 | 75 | 88 | 69 | 83 |
| composition | 2 | 0 | 22 | 41 | 60 | 83 | 77 | 91 |
| (Cu %) | 5 | 0 | 18 | 38 | 55 | 79 | 81 | 95 |
| without stirring | | | | | | | | | |
| coating | 0.5 | 100 | 100 | 80 | 90 | 93 | 65 | 80 |
| composition | 2 | 0 | 22 | 42 | 63 | 83 | 74 | 89 |
| (Cu %) | 5 | 0 | 18 | 40 | 56 | 79 | 81 | 95 |
| with stirring | | | | | | | | | |
| appearance with stirring | 0.5 | copper red crude deposit | copper red crude deposit | cupronickel color not glossy | copper red crude deposit | copper red crude deposit | copper red crude deposit | cupronickel color not glossy |
| | 2 | silver white glossy | silver white glossy | silver white glossy | silver white glossy | cupronickel color not glossy | cupronickel color semi-glossy | copper red not glossy |
| | 5 | silver white glossy | silver white glossy | silver white glossy | silver white glossy | cupronickel color not glossy | cupronickel color not glossy | copper red not glossy |
| stability of plating bath formation of turbidity · precipitates after allowed to stand for 7 days at room temperature | | none | none | none | none | none | none | none |

The invention claimed is:

1. A copper-nickel alloy electroplating bath comprising:
(a) a copper salt and a nickel salt;
(b) a metal complexing agent selected from the group consisting of monocarboxylic acids, dicarboxylic acids, polycarboxylic acids, oxycarboxylic acids, keto-carboxylic acids, amino acids, aminocarboxylic acids, and salts thereof;
(c) a plurality of conductivity-providing salts different from each other, consisting of
   (i) at least one inorganic halide salt selected from the group consisting of chloride salts, bromide salts, and iodide salts of each magnesium, sodium, potassium, and ammonium, and
   (ii) at least one inorganic sulfate or lower alkane sulfonate wherein the inorganic sulfate is selected from the group consisting of magnesium sulfate, sodium sulfate, potassium sulfate, and ammonium sulfate, and the lower alkanesulfonate is selected from the group consisting of magnesium salts, sodium salts, potassium salts, and ammonium salts;
(d) a compound selected from the group consisting of disulfide compounds represented by general formula (I):

$$A\text{-}R^1\text{—}S\text{—}S\text{—}R^2\text{-}A \quad (I)$$

wherein $R^1$ and $R^2$ each represent a hydrocarbon group, and A represents an $SO_3Na$ group, an $SO_3H$ group, an OH group, an $NH_2$ group, or an $NO_2$ group, and sulfur-containing amino acids represented by general formula (II) or a salt thereof;

$$R\text{—}S\text{—}(CH_2)_n CHNHCOOH \quad (II)$$

wherein R represents a hydrocarbon group, —H, or —$(CH_2)_n$CHNHCOOH and each n is independently 1 to 50;

(e) a compound selected from the group consisting of aromatic sulfonic acids, alkene sulfonic acids, alkyne sulfonic acids, benzoic sulfimide (saccharin), and salts thereof; and
(f) a water soluble polymer having the structure

wherein $R^1$ is derived from a polyvalent alcohol having the structure $R^1$—OH,
wherein A is selected from the group consisting of:

wherein n is at least 1, m is an integer from 0 to 3, and $R^2$ is selected from H or $R^1$, and
wherein the bath has a pH of 3 to 8.

2. The copper-nickel alloy electroplating bath according to claim 1, wherein a metal coating to be deposited has a copper/nickel composition ratio of 5/95 to 95/5.

3. A method for electroplating a substrate with a copper-nickel alloy, the substrate being selected from the group consisting of metal substrates made of copper, iron, nickel, silver, gold, and alloys thereof, and a glass substrate, a ceramic substrate, and a plastic substrate whose surfaces are modified with any of the metals and alloys, the method comprising electroplating by using the copper-nickel alloy electroplating bath according to claim 1.

4. The method of claim 1, wherein the changes in Cu % in the plated coating obtained from the copper-nickel alloy electroplating bath are not more than 5% when the cathode current density is changed from 0.5 A/dm$^2$ to 5 A/dm$^2$.

* * * * *